US012259919B2

(12) United States Patent
Ganti et al.

(10) Patent No.: US 12,259,919 B2
(45) Date of Patent: Mar. 25, 2025

(54) RARE TOPIC DETECTION USING HIERARCHICAL CLUSTERING

(71) Applicant: INTERNATIONAL BUSINESS MACHINES CORPORATION, Armonk, NY (US)

(72) Inventors: Raghu Ganti, White Plains, NY (US); Mudhakar Srivatsa, White Plains, NY (US); Shreeranjani Srirangamsridharan, White Plains, NY (US); Yeon-sup Lim, White Plains, NY (US); Dakshi Agrawal, Monsey, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 412 days.

(21) Appl. No.: 16/596,399

(22) Filed: Oct. 8, 2019

(65) Prior Publication Data
US 2021/0103608 A1 Apr. 8, 2021

(51) Int. Cl.
*G06F 16/353* (2025.01)
*G06F 16/334* (2025.01)
*G06N 5/04* (2023.01)
*G06N 20/00* (2019.01)

(52) U.S. Cl.
CPC ........ *G06F 16/353* (2019.01); *G06F 16/3347* (2019.01); *G06N 5/04* (2013.01); *G06N 20/00* (2019.01)

(58) Field of Classification Search
None
See application file for complete search history.

(56) References Cited

U.S. PATENT DOCUMENTS

| 6,963,830 | B1 | 11/2005 | Nakao |
| 7,451,395 | B2 | 11/2008 | Brants et al. |
| 7,644,102 | B2 | 1/2010 | Gaussier et al. |
| 8,645,298 | B2 | 2/2014 | Henning et al. |

(Continued)

FOREIGN PATENT DOCUMENTS

| AU | 2020364386 A1 | 3/2022 |
| AU | 2020364386 B2 | 1/2024 |

(Continued)

OTHER PUBLICATIONS

"Emerging topic detection on Twitter based on temporal and social terms evaluation", Cataldi et al., MDMKDD'10, July 25, Washington, DC, USA, (10).

(Continued)

*Primary Examiner* — Yu Zhao
(74) *Attorney, Agent, or Firm* — Robert R. Aragona

(57) ABSTRACT

Embodiments for providing rare topic detection using hierarchical topic modeling by a processor. A hierarchical topic model may be learned from one or more data sources. One or more dominant words in a selected cluster may be iteratively removed using the hierarchical topic model. The dominant words may relate to one or more primary topics of the cluster. The learned hierarchical topic model may be seeded with one or more words, n-grams, phrases, text snippets, or a combination thereof to evolve the hierarchical topic model and the removed dominant words are reinstated upon completion of the seeding.

20 Claims, 6 Drawing Sheets

(56) References Cited

U.S. PATENT DOCUMENTS

| | | | |
|---|---|---|---|
| 9,430,563 B2 | 8/2016 | Clinchant et al. | |
| 9,575,952 B2 | 2/2017 | Kumar Rangarajan Sridhar | |
| 9,697,245 B1* | 7/2017 | Butler | G06F 16/353 |
| 2003/0212679 A1* | 11/2003 | Venkayala | G06F 16/35 |
| 2007/0078889 A1 | 4/2007 | Hoskinson | |
| 2007/0294241 A1* | 12/2007 | Surendran | G06F 16/355 707/999.005 |
| 2008/0109399 A1* | 5/2008 | Liao | G06F 16/345 |
| 2008/0222140 A1* | 9/2008 | Lagad | G06F 16/951 707/999.005 |
| 2010/0153318 A1* | 6/2010 | Branavan | G06F 40/169 706/46 |
| 2011/0270830 A1* | 11/2011 | Stefik | G06F 16/353 707/731 |
| 2013/0212110 A1* | 8/2013 | Stankiewicz | G06Q 30/0631 707/740 |
| 2015/0339381 A1* | 11/2015 | Jain | G06F 16/9024 707/798 |
| 2016/0034757 A1 | 2/2016 | Chhichhia | |
| 2017/0192972 A1 | 7/2017 | Butler | |
| 2017/0228654 A1* | 8/2017 | Skupin | G06F 16/22 |
| 2018/0018316 A1* | 1/2018 | Bogdan | G06F 16/285 |
| 2018/0032606 A1* | 2/2018 | Tolman | G06F 16/93 |
| 2018/0232658 A1* | 8/2018 | Acharya | G06N 7/01 |
| 2018/0323548 A1 | 8/2018 | Acharya | |
| 2021/0103608 A1 | 4/2021 | Ganti | |

FOREIGN PATENT DOCUMENTS

| | | |
|---|---|---|
| CN | 103927176 A | 7/2014 |
| CN | 103970865 A | 8/2014 |
| CN | 109544632 A | 3/2019 |
| CN | 114424197 A | 4/2022 |
| GB | 2604276 A | 8/2022 |
| JP | 2022552140 A | 12/2022 |
| KR | 20220050915 A | 4/2022 |
| WO | 2021070005 A1 | 4/2021 |

OTHER PUBLICATIONS

"Word network topic model: a simple but general solution for short and imbalanced texts", Zuo et al., Dec. 17, 2014 (19 Pages).

Australian Government IP Australia, "Examination report No. 1 for standard patent application," IP Australia, Feb. 15, 2023, 4 pages, AU Application No. 2020364386.

Blei, et al., "Latent Dirichlet Allocation," The Journal of Machine Learning Research [article], Mar. 1, 2023, 30 pages, vol. 3, Retrieved from the Internet: <URL: https://dl.acm.org/doi/10.5555/944919.944937>.

Müllner, "Modern hierarchical, agglomerative clustering algorithms," Stanford University, Sep. 12, 2011, 29 pages, arXiv:1109.2378v1, Retrieved from the Internet: <URL: https://arxiv.org/abs/1109.2378>.

Japan Patent Office, "Notice of Reasons for Refusal," Japan Patent Office, Apr. 9, 2024, 6 pages, Japanese Patent Application No. 2022-520298, Translated.

Intellectual Property Office of Singapore, "Written Opinion," Aug. 13, 2024, 9 Pages, SG Application No. 11202202832R.

Intellectual Property Office, "Request for the Submission of an Opinion," Jan. 20, 2025, 13 Pages, KR Application No. 10-2022-7008090.

\* cited by examiner

RARE TOPIC DETECTION USING HIERARCHICAL CLUSTERING

BACKGROUND OF THE INVENTION

Field of the Invention

The present invention relates in general to computing systems, and more particularly to, various embodiments for providing rare topic detection using hierarchical clustering using a computing processor.

Description of the Related Art

The advent of computers and networking technologies have made possible the increase in the quality of life while enhancing day-to-day activities and simplifying the sharing of information. Due to the recent advancement of information technology and the growing popularity of the Internet, a vast amount of information is now available in digital form. Such availability of information has provided many opportunities. Digital and online information such as, for example, communication messaging in real-time has become very popular in recent years. As great strides and advances in technologies come to fruition, the greater the need to make progress in these systems advantageous for efficiency and improvement.

SUMMARY OF THE INVENTION

Various embodiments for providing rare topic detection using hierarchical topic modeling by a processor are provided. A hierarchical topic model may be learned from one or more data sources. One or more dominant words in a selected cluster may be iteratively removed using the hierarchical topic model. The dominant words may relate to one or more primary topics of the cluster. The learned hierarchical topic model may be seeded with one or more words, n-grams, phrases, text snippets, or a combination thereof to evolve the hierarchical topic model and the removed dominant words are reinstated upon completion of the seeding.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
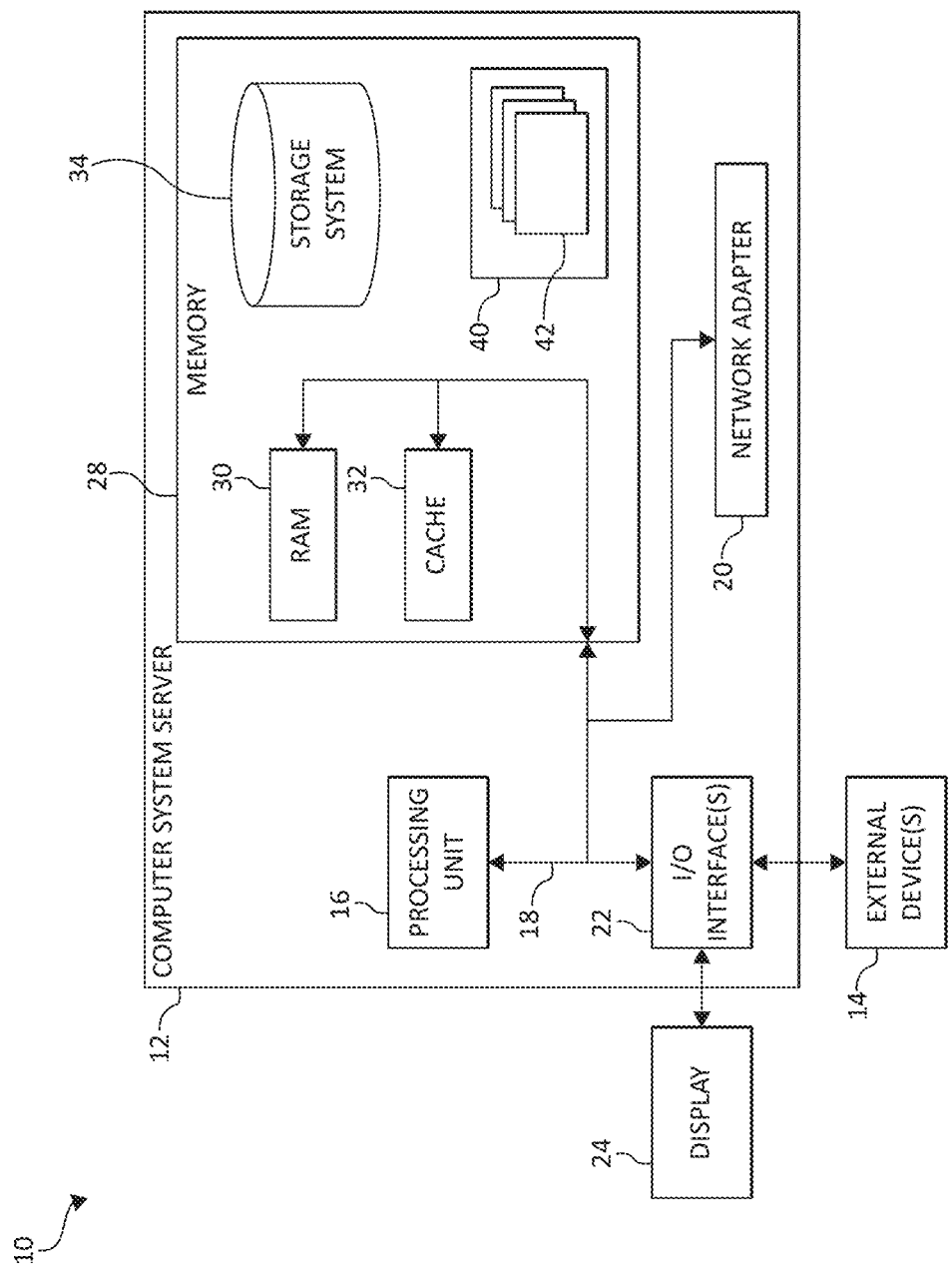
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of various organizations and groups or individuals, including scientific, political, governmental, educational, businesses, and so forth. With the increased use of collaborative and social communication, communication via text-based communication will also increase. For both business and recreational purposes, real-time communication messages (e.g., real-time chat discourses) are part and parcel of modern society. However, for various entities, irrespective of size, using such collaborative and social means of communication can be an overwhelming experience, particularly when large volumes of text-based data are generated by various applications and services.

Moreover, various types of entities (e.g., businesses, organizations, governmental agencies, educational institutions, and the like) often engage in corpus linguistics, which is the study of language as expressed in corpora (i.e., collections) of "actual use" text. The core idea of corpus linguistics is that analysis of expression is best conducted within its natural usage. By collecting samples of writing, researchers can understand how individuals converse with each other. As such, the present invention employs various techniques that assist in understanding and interpreting message based data.

In one aspect, topic modeling may be used to discover a semantic structure within a text corpus. Topic modeling may employ one or more operations to infer the topic and meaning in text based documents and/or discourse. Topic modeling and text mining may be used to gain insights into the various communications. For example, if a business can mine customer feedback on a particular product or service, this information may prove valuable. One of the recommendations when employing text mining/topic modeling techniques is that the more data available for analysis, the better the overall results. However, even with the use of large data, practitioners may have a requirement to text mine a single conversation or small text corpus to infer meaning.

Additionally, during communication (e.g., a conversation between one or more users that may be in text form (e.g., documents, emails, presentations, etc.) and/or audio/video form, it becomes necessary to quickly and adaptatively understand the communication/conversation while providing intelligent interpretation, summary, and/or understanding pertaining to the topics of such communications/conversations.

In some cases, for example, document clustering is to group similar documents together, assigning them to the same implicit topic. Document clustering provides the ability to improve the effectiveness of information retrieval. Latent Semantic Analysis operation and Agglomerative hierarchical clustering have recently been employed for grouping objects into clustering based on similarities. For example, Latent Semantic Analysis, in which given n sentences, the framework lists concepts referenced in those sentences. That is, a topic is a "bag of words," where each document has multiple topics (with a multinomial distribution) and each topic has words (with a Dirichlet distribution). However, the challenge with the Latent Semantic Analysis is that the communication/conversation (e.g., conversational/spoken English) words in a topic fails to satisfy a Dirichlet generative process and does not have the notion of hierarchical topics (e.g., data is a class of data plan and the data plan is a class of international data plan).

In hierarchical agglomerative operations, documents are recursively merged bottom up, yielding a decision tree of recursively partitioned clusters. The distance measures used to find similarity vary from single-link to more computationally expensive ones, but they are closely tied to nearest-neighbor distance. The hierarchical agglomerative operation works by recursively merging the single best pair of documents or clusters, making the computational costs prohibitive for document collections numbering in the tens of thousands. That is, the documents are represented as vectors with distance between them (e.g., Euclidian). However, the distance metrics fail when "dominant" words are not removed from vectors at lower levels of hierarchy (e.g., data is dominant at highest level and occurs 30% of conversations, "international" occurs only in 1%). Thus, challenges still remain for providing a summary of a corpus of communications/conversations (as compared to just a document) into topics.

Accordingly, various embodiments are illustrated herein to provide rare topic detection using hierarchical topic modeling by a processor are provided. A hierarchical topic model may be learned from one or more data sources. One or more dominant words in a selected cluster may be iteratively removed using the hierarchical topic model. The dominant words may relate to one or more primary topics of the cluster. The learned hierarchical topic model may be seeded with one or more words, n-grams, phrases, text snippets, or a combination thereof to evolve the hierarchical topic model and the removed dominant words are reinstated upon completion of the seeding.

In one aspect, the present invention provides for hierarchical topic modeling by providing a summarized version of calls (e.g., speech-to-text transcript of customer-agent interaction) clustered into multiple topics. That is, hierarchical topic modeling works on any type of text document and a long text document may be converted to a summary, which is typically a set of ngrams.

A summary of ngrams' words may be used to generate word vectors and the word vectors may be weighted according to one or more assigned scores. A K means clusters operation may be employed in one iteration on summary word vectors into K clusters, where "K" is a positive integer or defined value. The K clusters may include one or more "king clusters." In one aspect, a king cluster is a largest cluster (e.g., a cluster containing the most documents or data sources) from the total number of K clusters. The king cluster may be a largest cluster from within the plurality of clusters.

For each cluster that is a king cluster, the hierarchical topic modeling operation repeats execution by removing one or more "relevant" words from the previous run/execution (which are no longer discriminatory for the next hierarchical topic modeling). In so doing, one or more rare topics are identified through a progressive drilldown operation (e.g., from iteratively performing the hierarchical topic modeling operation) as dominant words are removed. Ngrams, snippets, and suggested topic names for each representative cluster may be identified. One or more words that have been removed/suppressed may be used for ngram/snippet identification to improve and provide enhanced readability/interpretability for one or more user.

For example, consider the hierarchical topic modeling operation where the word "access" is removed in a first iteration (e.g., iteration "0"). In a next/subsequent iterative hierarchical topic modeling operation, the words "vpn," and "root," may be removed in one or more subsequent, iterative hierarchical topic modeling operation (e.g., iteration "1" and/or iteration "N"). Upon conclusion of the iterative hierarchical topic modeling operations, the dominant words may be restored/unsuppressed while providing an interpretable explanation (e.g., understandable to a user) using one or more artificial intelligence ("AI") operations such as, for example, "unable to access the vpn" and/or "root access failed." Additionally, the present invention provides for automated configuration for iterative hierarchical topic modeling such as, for example, configurable to select a number of iterations, synonyms to identify "similar" clusters. The operations for providing rare topic detection using hierarchical clustering also enable post-processing so as to combine or split one or more clusters, where each cluster is understandable/interpretable by one or more users.

In one aspect, one or more hierarchical topic model used for incremental training and identifying differences may be learned. The learned hierarchical topic model (e.g., a new tree structure) may be seeded using existing hierarchical topic model (e.g., an existing tree structure. Each clustering model in each tree node may be seeded based on the existing hierarchical topic model. It should be noted that hierarchical topic model is in the form of tree structure, where each node denotes a topic. The node that corresponds to king cluster gets broken down in each iteration. Incremental training denotes a procedure in which instead of training a topic model from scratch, training procedure starts with an old model and then finds an optimal model with the new dataset. The learned existing hierarchical topic model may be retrained on the new dataset and results in exploring incrementally optimal solutions for a clustering problem in the neighborhood of a previous solution. To further illustrate, consider a topic model "v1" (e.g., an existing topic model) trained on dataset 1 and a topic model "v2" (e.g., a new topic model trained on dataset 2 with topic model v1 as the seed model. The dataset 2 is the new dataset. On dataset 2, the present invention finds and/or identifies an optimal topic model that is close to the topic model v1 as compared to learning a topic model from the scratch. The underlying K-means clustering is seeded with the old topic model v1 to obtain the new topic model v2. The seed model is a topic model trained for a particular time window and the new model is trained on next time window with the new dataset.

In one aspect, the one or more hierarchical topic models may be used to identify/detect a change in clusters using (a) cluster centers that have drifted the most are identified as significant change candidates, (b) cluster weights that have significant differences, (c) a cohesiveness measure of the cluster has changed significantly, and (d) a tree structure that has changed. That is, the "change detection" refers to how has the newly trained topic model changed with respect to the seed model and the changes may be observed as described in (a)-(d).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
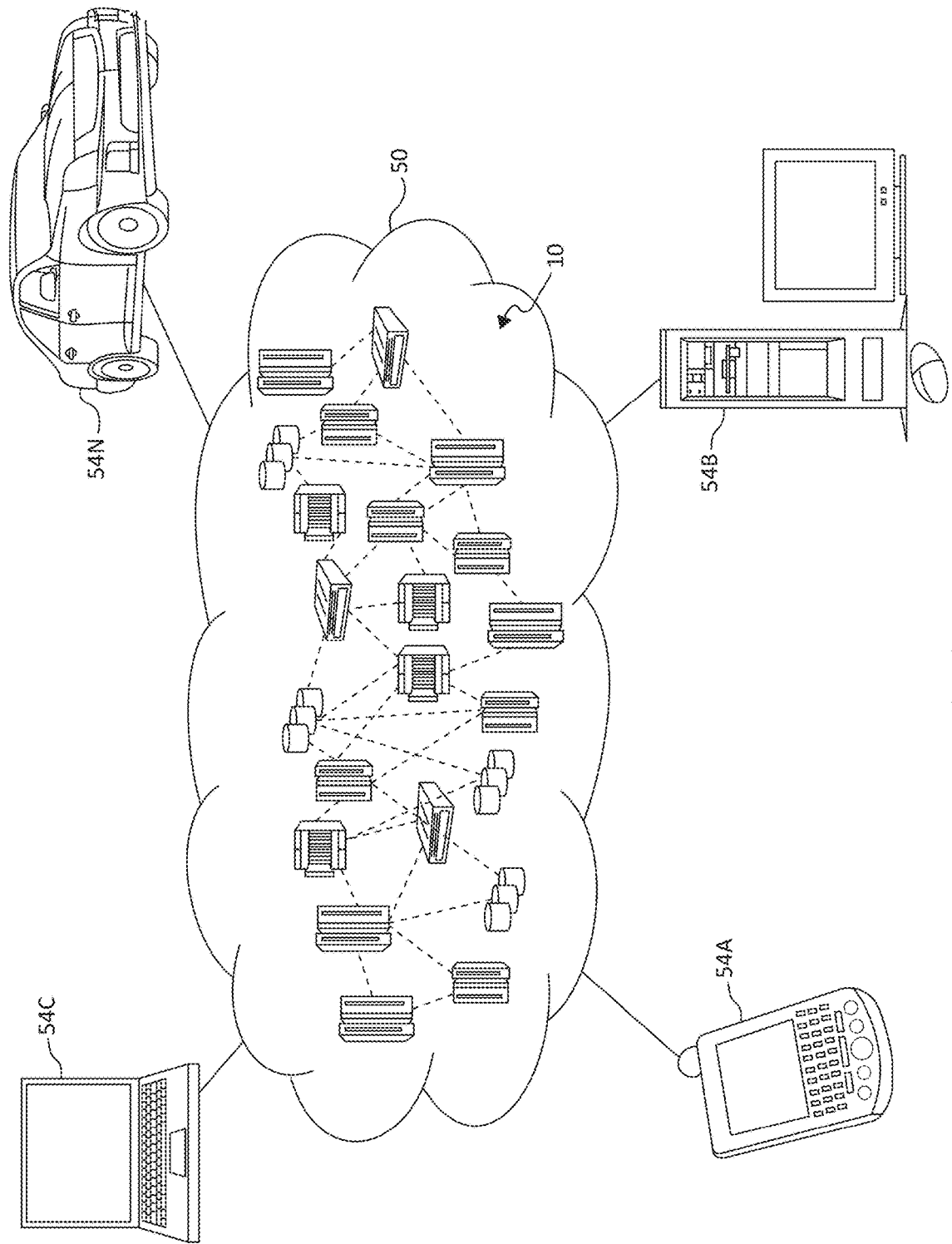
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
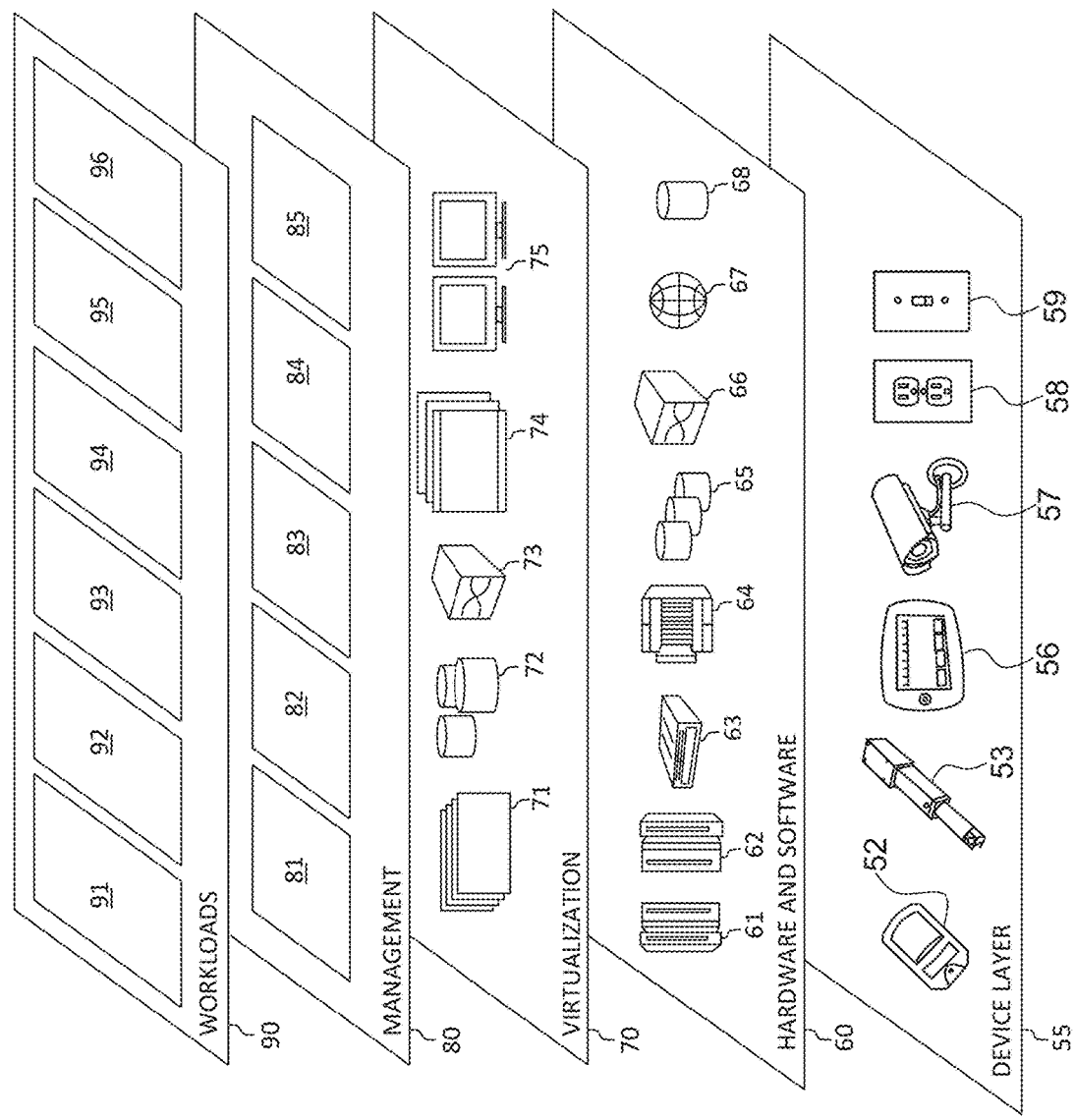
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing rare topic detection using hierarchical clustering. In addition, workloads and functions 96 for providing rare topic detection using hierarchical clustering may include such operations as data analysis (including data collection and processing from organizational databases, online information, knowledge domains, data sources, and/or social networks/media, and other data storage systems, and predictive and data analytics functions. One of ordinary skill in the art will appreciate that the workloads and functions 96 for providing rare topic detection using hierarchical clustering may also work in conjunction with other portions of the various abstractions layers, such as those in hardware and software 60, virtualization 70, management 80, and other workloads 90 (such as data analytics and/or fungibility processing 94, for example) to accomplish the various purposes of the illustrated embodiments of the present invention.

Figure 4:
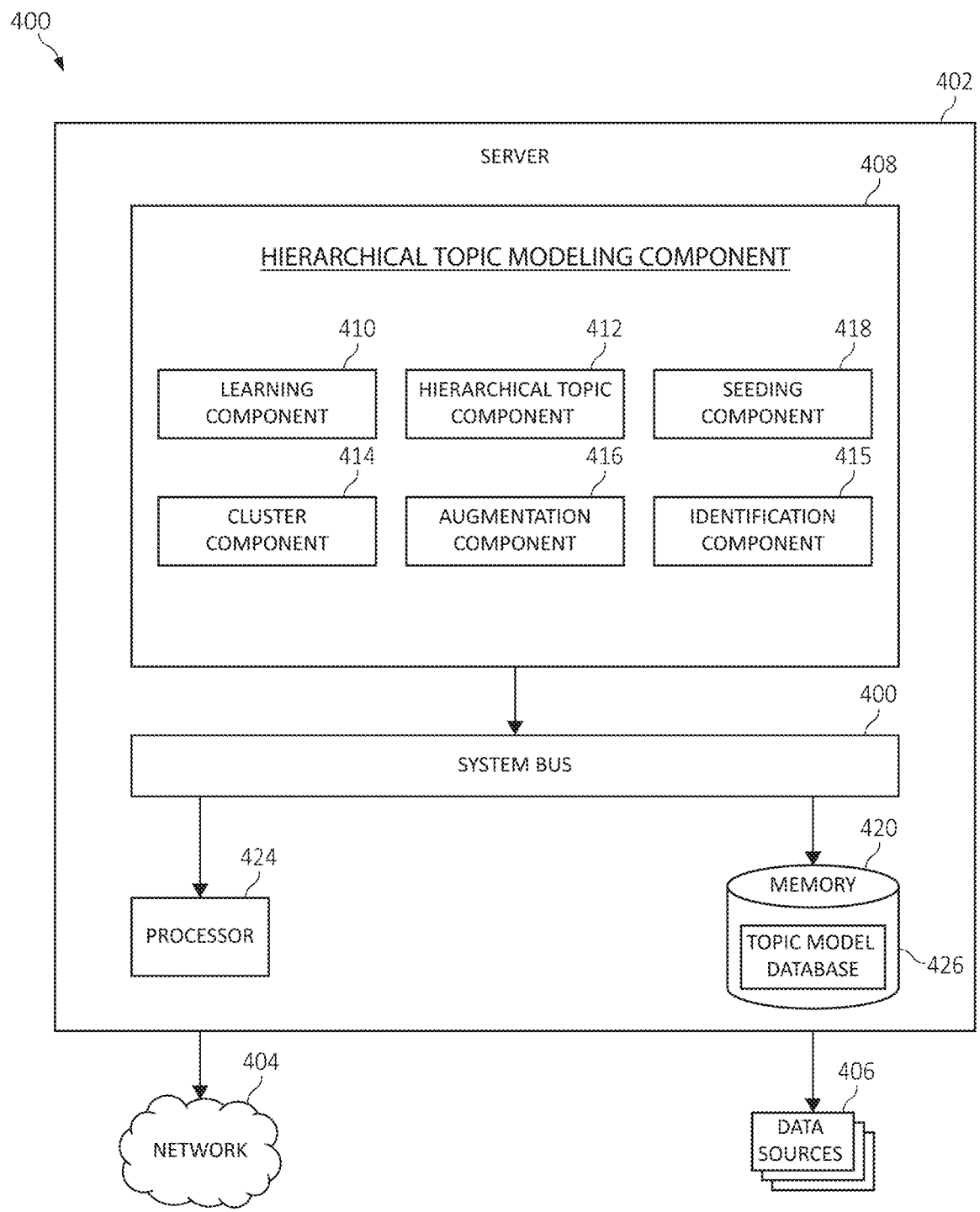
FIG. 4 is an additional diagram depicting analyzing real-time conversation data and recording inter-arrival times between messages in accordance with aspects of the present invention.

Turning now to FIG. 4, a block diagram 400 depicts a computing system for providing rare topic detection using hierarchical clustering. In one aspect, one or more of the components, modules, services, applications, and/or functions described in FIGS. 1-3 may be used in FIG. 4. For example, computer system/server 12 of FIG. 1, incorporating processing unit 16, may be used to perform various computational, data processing and other functionality in accordance with various aspects of the present invention.

As shown in FIG. 4, the system 400 can include a server 402, one or more networks 404, and one or more data sources 406. The server 402 can include a hierarchical topic modeling component 408, which can include a learning component 410, hierarchical topic component 412, cluster component 414, identification component 415, augmentation component 416, and/or a seeding component 418. The server 402 can also include or otherwise be associated with at least one memory 420. The server 402 can further include a system bus 422 that can couple the various components including, but not limited to, the hierarchical topic modeling component 408 and associated components, memory 420 and/or processor 424. While a server 402 is shown in FIG. 4, in other embodiments, any number of different types of devices can be associated with or include the components shown in FIG. 4 as part of the hierarchical topic modeling component 408. All such embodiments are envisaged.

The hierarchical topic modeling component 408 can facilitate rare topic detection using hierarchical topic modeling that may be learned from one or more data sources 406. The data sources 406 may include structured and/or unstructured data. The term "unstructured data" can refer to data presented in unrestricted natural language and meant for human consumption. Unstructured data can include, but is not limited to: conversational data associated with a computing system/application for communication with one or more users, social media posts and/or commentary, and associated metadata, made by one or more users, news posts and/or commentary, and associated metadata, and/or posts and/or commentary, and associated metadata, on one or more websites which foster discussion. The unstructured data can be generated by one or more entities (e.g., one or more users) and can include information contributed to a corpus (e.g., the Internet, website, network, etc.) in a non-numerical language (e.g., a spoken language) intended for human consumption.

In various embodiments, the one or more data sources 406 can include data that is accessible to the server 402 either directly or via one or more networks 404 (e.g., an intranet, the Internet, communication system, and/or a combination thereof). For example, the one or more data sources 406 can include a computer-readable storage device (e.g., a primary storage device, a secondary storage device, a tertiary storage device or an off-line storage device) that can store user-generated data. In another example, the one or more data sources 406 can include a community host that includes a website and/or application that facilitates sharing of user-generated data via a network (e.g., the Internet).

The one or more servers 402, including hierarchical topic modeling component 408, and the one or more data sources 406 can be connected either directly or via one or more networks 404. Such networks 404 can include wired and wireless networks, including, but not limited to, a cellular network, a wide area network (WAN) (e.g., the Internet) or a local area network (LAN). For example, the server 402 can communicate with one or more data sources 406 (and vice versa) using virtually any desired wired or wireless technology, including, for example, cellular, WAN, wireless fidelity (Wi-Fi), Wi-Max, WLAN, etc. Further, although in the embodiment shown the hierarchical topic modeling component 408 is provided on a server device 402, it should be appreciated that the architecture of system 400 is not so limited. For example, the hierarchical topic modeling component 408 or one or more components of hierarchical topic modeling component 408 can be located at another device, such as another server device, a client device, etc.

In one aspect, the learning component 410 may learn a hierarchical topic model from one or more data sources 406. The learning component 410 may perform one or more machine learning operation such as, for example, natural language processing ("NLP"). The topic model database 426 may store, maintain, and access each hierarchical topic model (including each newly learned hierarchical topic model), which may be kept/stored in the memory 420 via the topic model database 426.

The clustering component 414 may generate one or more word vectors from the data obtained from the one or more data sources 406 and score each of the one or more word vectors. The clustering component 414 may also generate a plurality of clusters from the one or more word vectors. A selected cluster may be identified from the plurality of clusters and is identified/labeled as a king cluster. That is, a K means clustering operation may be employed in each iteration on summarizing word vectors into K clusters, where "K" is a positive integer or defined value. The K clusters may include one or more "king clusters." In one aspect, the king cluster is a largest cluster (e.g., a cluster containing the most documents or data sources) from the total number of K clusters. The king cluster and may be a largest cluster from the plurality of clusters.

The clustering component 414 may split the selected cluster into a plurality of clusters at each iteration. The clustering component 414, in association with the identification component 415, may identify an alternative selected cluster (e.g., a second or alternative king cluster) from the plurality of clusters while iteratively remove one or more dominant words in the alternative selected cluster. That is, the clustering component 414, in association with the identification component 415, may identify one or more differences between each of the plurality of clusters while iteratively removing one or more dominant words in the selected cluster at each iteration. In one aspect, the alternative selected cluster may also be a king cluster and the alternative king cluster is a largest cluster from a subsequent clustering iteration of the plurality of clusters.

The hierarchical topic component 412 may iteratively remove one or more dominant words in a selected cluster using the hierarchical topic model. In one aspect, the dominant words relate to one or more primary topics of the cluster.

The seeding component 418 may seed the learned hierarchical topic model with one or more words, n-grams, phrases, text snippets, or a combination thereof to evolve the hierarchical topic model. The hierarchical topic component 412, in association with the seeding component 418 and/or the augmentation component 416, may reinstate the removed dominant words upon completion of the seeding. In one aspect, the seeding component 418 may seed the hierarchical topic model with an existing topic model. Also, the seeding component 418 may seed each of a plurality of clusters according to one or more cluster models.

Thus, the hierarchical topic modeling component 408 provides for explainability and interpretability where the topics may be interpretable by a domain expert (e.g., description of the topic is readable by a user). The hierarchical topic modeling component 408 provides multi-level summarization (e.g., words, ngrams, snippets, document). In one aspect, word and ngram level representations may be used for machine learning and ngram and snippet level representations are for analyst consumption by the domain expert. The hierarchical topic modeling component 408 provides scalability and real-time scoring (in real-time) where the training may occur from one or more corpuses and the hierarchical topic model may be trained in real-time.

Thus, as described herein, the hierarchical topic modeling component 408 provides for learning a hierarchical topic model that progressively removes (e.g., suppresses or conceals) one or more dominant words in a king cluster. The king cluster may be identified by (a) size (e.g., king clusters are determined by the size of the cluster) and (b) lack of cohesiveness (e.g., large clusters tend to have a low cohesiveness as they are more sparse). The hierarchical topic modeling component 408 provides for augmenting the learned hierarchical topic model with human interpretable words, phrases, and snippets. The removed words (e.g., suppressed or concealed words) may be reinstated (e.g., unsuppressed and/or unconcealed) along the hierarchy to provide increased explainability. The hierarchical topic modeling component 408 provides for topic evolution through seeding of the topic model for incremental training. A suite of metrics may be used for capturing differences (e.g., size, cohesiveness, shift in centroids, change to tree structure). In one aspect, the suite of metric may be used to capture differences between new and old topic model such as, for example: 1) size (e.g., how has cluster (topic) size such as, for example, has the number of documents that fall under a topic changed, 2) cohesiveness (e.g., has the cluster become sparse or tight?), 3) shift in centroids (e.g., how have the clusters centers moved?), and/or 4) a change to a tree structure (e.g., has the overall structure of the topic model changed?).

Figure 5:
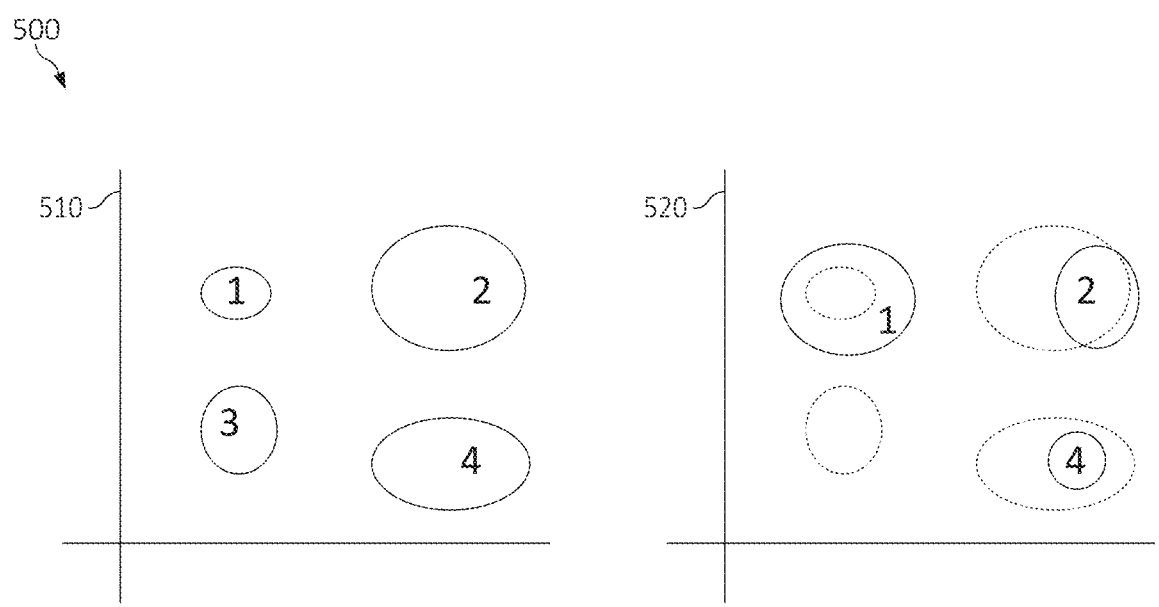
FIG. 5 is a graph diagram depicting rare topic detection using hierarchical topic modeling in accordance with aspects of the present invention.

Turning now to FIG. 5, diagram 500 depicts rare topic detection using hierarchical topic modeling. That is, diagram 500 depicts multiple clusters assuming document feature vectors are in 2-dimensional ("2D") space. In one aspect, one or more of the components, modules, services, applications, and/or functions described in FIGS. 1-5 may be used in FIG. 5. Repetitive description of like elements, components, modules, services, applications, and/or functions employed in other embodiments described herein is omitted for sake of brevity.

For example, diagram 510 (e.g., original hierarchical topic model 510) depicts an original/existing topic model with clusters 1 through 4. Diagram 520 (e.g., new hierarchical topic model 520) depicts the evolution of topic modeling by providing rare topic detection using hierarchical topic modeling. That is, new hierarchical topic model 520 is obtained after seeding the original hierarchical topic model 510. As depicted, cluster 1 of the new hierarchical topic model 520 has increased in size. Cluster 2's center has shifted and the center of the of the new hierarchical topic model 520 has shrunken in size. Cluster 3 of the new hierarchical topic model 520 has disappeared (e.g., been eliminated). Cluster 4 has decreased in size. It should be noted that hierarchical topic model 520 is used by way of example only and illustrated how topic model are evolved from original seed model. Thus, as depicted, based upon the seeding and retraining the hierarchical topic model 520 on the new dataset, one or more optimal solutions are incrementally identified for a clustering with the clusters evolving into one or more different shapes, sizes, and/or even existence.

Figure 6:
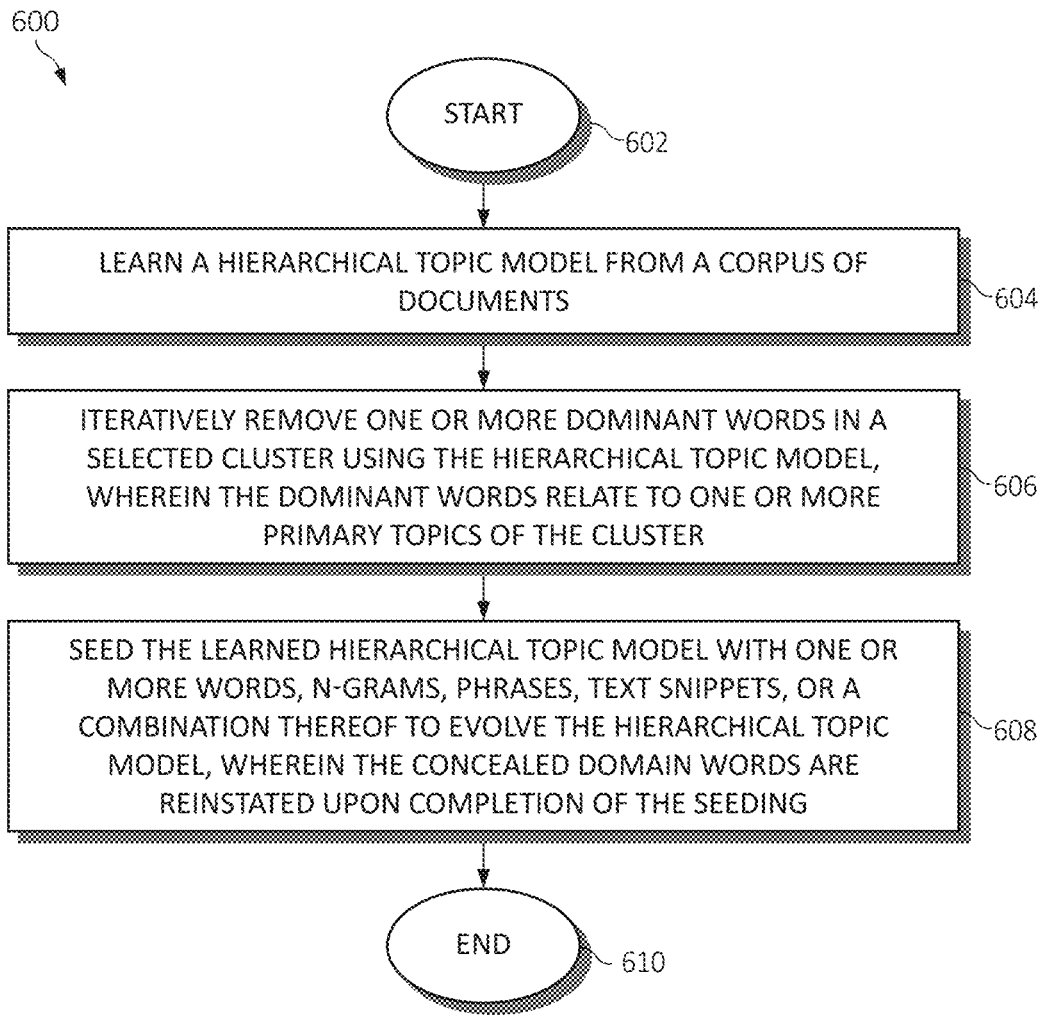
FIG. 6 is a flowchart diagram depicting an exemplary method for providing rare topic detection using hierarchical topic modeling by a processor; again, in which aspects of the present invention may be realized.

Turning now to FIG. 6, a method 600 for providing rare topic detection using hierarchical topic modeling by a processor is depicted, in which various aspects of the illustrated embodiments may be implemented. That is, FIG. 6 is a flowchart of an additional example method 600 for providing rare topic detection using hierarchical topic modeling in a computing environment according to an example of the present invention. The functionality 600 may be implemented as a method executed as instructions on a machine, where the instructions are included on at least one computer readable medium or one non-transitory machine-readable storage medium. The functionality 600 may start in block 602.

A hierarchical topic model may be learned from one or more data sources, as in block 604. One or more dominant words in a selected cluster may be iteratively removed using the hierarchical topic model, as in block 606. The dominant words may relate to one or more primary topics of the cluster. The learned hierarchical topic model may be seeded with one or more words, n-grams, phrases, text snippets, or a combination thereof to evolve the hierarchical topic model and the removed dominant words are reinstated upon completion of the seeding, as in block 608. The functionality 600 may end in block 610.

In one aspect, in conjunction with and/or as part of at least one block of FIG. 6, the operation of 600 may include one or more of each of the following. The operation of 600 may generate one or more word vectors and scoring each of the one or more word vectors and also generate a plurality of clusters from the one or more word vectors, wherein the selected cluster is identified from the plurality of clusters and is a king cluster, wherein the king cluster is a largest cluster from the plurality of clusters. The operation of 600 may split the selected cluster into a plurality of clusters at each iteration, and/or identify an alternative selected cluster from the plurality of clusters while iteratively remove one or more dominant words in the alternative selected cluster. The alternative selected cluster is a king cluster and the king cluster is a largest cluster from the plurality of clusters.

The operation of 600 may seed the hierarchical topic model with an existing topic model, and/or seed each of a plurality of clusters according to one or more cluster models.

The operation of 600 may identify one or more differences between each of the plurality of clusters while iteratively removing one or more dominant words in the selected cluster at each iteration.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks that may be shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing rare topic detection using hierarchical topic modeling by a processor, comprising:
    executing machine learning logic to learn a hierarchical topic model from one or more data sources;
    in conjunction with learning the hierarchical topic model, executing the machine learning logic to train the hierarchical topic model by iteratively removing one or more dominant words in a selected cluster using the hierarchical topic model during a progressive drilldown operation through a plurality of hierarchical topic modelling executions, wherein, at each iteration of the plurality of hierarchical topic modelling executions, the progressive drilldown operation removes those of the one or more dominant words identified during a previous iteration which are no longer discriminatory for a next execution of the plurality of hierarchical topic modelling executions, and wherein the dominant words comprise words appearing in at least a defined percentage of conversations, relative to other non-dominant words appearing in less than the defined percentage of the conversations, as identified in the one or more data sources, and the dominant words that relate to one or more primary topics of the cluster; and
    executing the machine learning logic to further train the learned hierarchical topic model by seeding the learned hierarchical topic model with one or more words, n-grams, phrases, and text snippets to evolve the hierarchical topic model, wherein the removed dominant words are reinstated upon completion of the seeding, and wherein each of the dominant words removed from each iteration and reinstated upon completion of the seeding are together used to form a natural language explanation, provided to a user by way of a user interface, of each of the one or more primary topics resulting from the hierarchical topic model within a corpus of the one or more data sources.

2. The method of claim 1, further including generating one or more word vectors and scoring each of the one or more word vectors.

3. The method of claim 2, further including generating a plurality of clusters from the one or more word vectors, wherein the selected cluster is identified from the plurality of clusters and is a king cluster, wherein the king cluster is a largest cluster from the plurality of clusters.

4. The method of claim 1, further including:
    splitting the selected cluster into a plurality of clusters at each iteration;
    identifying an alternative selected cluster from the plurality of clusters while iteratively removing one or more dominant words in the alternative selected cluster, wherein the alternative selected cluster is a king cluster and the king cluster is a largest cluster from the plurality of clusters.

5. The method of claim 1, further including seeding the hierarchical topic model with an existing topic model.

6. The method of claim 1, further including seeding each of a plurality of clusters according to one or more cluster models.

7. The method of claim 1, further including identifying one or more differences between each of the plurality of clusters while iteratively removing the one or more dominant words in the selected cluster at each iteration.

8. A system for providing rare topic detection using hierarchical topic modeling in a computing environment, comprising:
    one or more computers with executable instructions that when executed cause the system to:
        execute machine learning logic to learn a hierarchical topic model from one or more data sources;
        in conjunction with learning the hierarchical topic model, execute the machine learning logic to train the hierarchical topic model by iteratively removing one or more dominant words in a selected cluster using the hierarchical topic model during a progressive drilldown operation through a plurality of hierarchical topic modelling executions, wherein, at each iteration of the plurality of hierarchical topic modelling executions, the progressive drilldown operation removes those of the one or more dominant words identified during a previous iteration which are no longer discriminatory for a next execution of the plurality of hierarchical topic modelling executions, and wherein the dominant words comprise words appearing in at least a defined percentage of conversations, relative to other non-dominant words appearing in less than the defined percentage of the conversations, as identified in the one or more data sources, and the dominant words that relate to one or more primary topics of the cluster; and
        execute the machine learning logic to further train the learned hierarchical topic model by seeding the learned hierarchical topic model with one or more words, n-grams, phrases, and text snippets to evolve the hierarchical topic model, wherein the removed dominant words are reinstated upon completion of the seeding, and wherein each of the dominant words removed from each iteration and reinstated upon completion of the seeding are together used to form a natural language explanation, provided to a user by way of a user interface, of each of the one or more primary topics resulting from the hierarchical topic model within a corpus of the one or more data sources.

9. The system of claim 8, wherein the executable instructions when executed cause the system to generate one or more word vectors and scoring each of the one or more word vectors.

10. The system of claim 9, wherein the executable instructions when executed cause the system to generate a plurality of clusters from the one or more word vectors, wherein the selected cluster is identified from the plurality of clusters and is a king cluster, wherein the king cluster is a largest cluster from the plurality of clusters.

11. The system of claim 8, wherein the executable instructions when executed cause the system to:
split the selected cluster into a plurality of clusters at each iteration; and
identify an alternative selected cluster from the plurality of clusters while iteratively removing one or more dominant words in the alternative selected cluster, wherein the alternative selected cluster is a king cluster and the king cluster is a largest cluster from the plurality of clusters.

12. The system of claim 8, wherein the executable instructions when executed cause the system to seed the hierarchical topic model with an existing topic model.

13. The system of claim 8, wherein the executable instructions when executed cause the system to seed each of a plurality of clusters according to one or more cluster models.

14. The system of claim 8, wherein the executable instructions when executed cause the system to identify one or more differences between each of the plurality of clusters while iteratively removing the one or more dominant words in the selected cluster at each iteration.

15. A computer program product for, by a processor, providing rare topic detection using hierarchical topic modeling, the computer program product comprising a non-transitory computer-readable storage medium having computer-readable program code portions stored therein, the computer-readable program code portions comprising:
an executable portion that executes machine learning logic to learn a hierarchical topic model from one or more data sources;
an executable portion that, in conjunction with learning the hierarchical topic model, executes the machine learning logic to train the hierarchical topic model by iteratively removing one or more dominant words in a selected cluster using the hierarchical topic model during a progressive drilldown operation through a plurality of hierarchical topic modelling executions, wherein, at each iteration of the plurality of hierarchical topic modelling executions, the progressive drilldown operation removes those of the one or more dominant words identified during a previous iteration which are no longer discriminatory for a next execution of the plurality of hierarchical topic modelling executions, and wherein the dominant words comprise words appearing in at least a defined percentage of conversations, relative to other non-dominant words appearing in less than the defined percentage of the conversations, as identified in the one or more data sources, and the dominant words that relate to one or more primary topics of the cluster; and
an executable portion that executes the machine learning logic to further train the learned hierarchical topic model by seeding the learned hierarchical topic model with one or more words, n-grams, phrases, and text snippets to evolve the hierarchical topic model, wherein the removed dominant words are reinstated upon completion of the seeding, and wherein each of the dominant words removed from each iteration and reinstated upon completion of the seeding are together used to form a natural language explanation, provided to a user by way of a user interface, of each of the one or more primary topics resulting from the hierarchical topic model within a corpus of the one or more data sources.

16. The computer program product of claim 15, further including an executable portion that generates one or more word vectors and scoring each of the one or more word vectors.

17. The computer program product of claim 16, further including an executable portion that generate a plurality of clusters from the one or more word vectors, wherein the selected cluster is identified from the plurality of clusters and is a king cluster, wherein the king cluster is a largest cluster from the plurality of clusters.

18. The computer program product of claim 15, further including an executable portion that:
splits the selected cluster into a plurality of clusters at each iteration; and
identifies an alternative selected cluster from the plurality of clusters while iteratively removing one or more dominant words in the alternative selected cluster, wherein the alternative selected cluster is a king cluster and the king cluster is a largest cluster from the plurality of clusters.

19. The computer program product of claim 15, further including an executable portion that:
seeds the hierarchical topic model with an existing topic model; or
seeds each of a plurality of clusters according to one or more cluster models.

20. The computer program product of claim 15, further including an executable portion that identifies one or more differences between each of the plurality of clusters while iteratively removing the one or more dominant words in the selected cluster at each iteration.

\* \* \* \* \*